(12) United States Patent
Yuan et al.

(10) Patent No.: US 8,201,792 B2
(45) Date of Patent: Jun. 19, 2012

(54) SUPPORT STAND FOR FLAT-PANEL DISPLAY MONITOR AND ELEVATING SUPPORT USED FOR SUPPORT STAND

(75) Inventors: Li-Jun Yuan, Shenzhen (CN); Chang-Sheng Fan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 315 days.

(21) Appl. No.: 12/463,502

(22) Filed: May 11, 2009

(65) Prior Publication Data
US 2010/0123054 A1    May 20, 2010

(30) Foreign Application Priority Data
Nov. 17, 2008    (CN) .......................... 2008 1 0305589

(51) Int. Cl.
*E04G 3/00* (2006.01)
(52) U.S. Cl. ...................... 248/299.1; 248/284; 248/121; 248/923; 361/679.21
(58) Field of Classification Search ................ 248/284.1, 248/299.1, 121, 917, 919, 922, 923; 361/679.21
See application file for complete search history.

(56) References Cited

U.S. PATENT DOCUMENTS

| | | | | |
|---|---|---|---|---|
| 6,695,274 B1 * | 2/2004 | Chiu | ............................ | 248/371 |
| 7,444,716 B2 * | 11/2008 | Hsu | ................................ | 16/366 |
| 7,494,104 B2 * | 2/2009 | Baek | ........................... | 248/372.1 |
| 7,497,408 B2 * | 3/2009 | Lim et al. | ................... | 248/284.1 |
| 7,597,302 B2 * | 10/2009 | Lee et al. | ...................... | 248/371 |
| 7,694,919 B2 * | 4/2010 | Lee | ........................... | 248/123.11 |
| 7,770,856 B2 * | 8/2010 | Depay | ........................ | 248/284.1 |
| 7,789,363 B2 * | 9/2010 | Duan | ........................ | 248/284.1 |
| 7,841,567 B2 * | 11/2010 | Wang | ............................ | 248/136 |
| 8,011,632 B2 * | 9/2011 | Wang et al. | ................ | 248/284.1 |
| 8,033,513 B2 * | 10/2011 | Jang et al. | ................. | 248/122.1 |
| 8,070,115 B2 * | 12/2011 | Wang et al. | .................. | 248/157 |
| 2008/0302926 A1 * | 12/2008 | Cheng et al. | ................. | 248/161 |

FOREIGN PATENT DOCUMENTS

| | | |
|---|---|---|
| CN | 201035268 Y | 3/2008 |
| CN | 201138903 Y | 10/2008 |

* cited by examiner

*Primary Examiner* — Terrell McKinnon
*Assistant Examiner* — Daniel J Breslin
(74) *Attorney, Agent, or Firm* — Altis Law Group, Inc.

(57) ABSTRACT

A support stand for a flat-panel display monitor includes a rotatable bracket, and an elevating support rotatably connected to the rotatable bracket. The elevating support includes a base member, a first rotatable module, a second rotatable module, and a third rotatable module. The first and second rotatable modules are both rotatably assembled between the rotatable bracket and the base member. The second rotatable module is positioned opposite to the first rotatable module. The first and second rotatable modules are spaced by a predetermined distance, and rotate along a same direction relative to the base member. The third rotatable module is positioned between the first and second rotatable modules, and rotatably follows the first and second rotatable modules.

12 Claims, 3 Drawing Sheets

SUPPORT STAND FOR FLAT-PANEL DISPLAY MONITOR AND ELEVATING SUPPORT USED FOR SUPPORT STAND

BACKGROUND

1. Technical Field

The present disclosure generally relates to support stands and elevating supports, particularly, to a support stand for a flat-panel display monitor and an elevating support.

2. Description of Related Art

Flat-panel display monitors, such as liquid crystal display monitors, offer advantages over cathode ray tube displays, such as reduced size, smaller weight, and better image quality. A viewing angle and height of the flat-panel display monitor can be adjusted without moving a support stand of the flat-panel display monitor because of its small weight.

A typical support stand generally includes a bracket to attach to the flat-panel display monitor, a rotatable bracket to fix the bracket, a base member, and an elevating mechanism rotatably mounted between the rotatable bracket and the base member. The rotatable bracket includes two side boards extending from opposite sides of the rotatable bracket. The elevating mechanism includes a first rotatable module rotatably connected to one side board of the rotatable bracket, and a second rotatable module rotatably connected to the other side board of the rotatable bracket. The height of the flat-panel display monitor is changed by the motion of the elevating mechanism.

However, in the typical support stand, just the two side boards of the rotatable bracket are supported by the first and second rotatable modules, and a portion of the rotatable bracket between the two side boards remains in a state without any support. If a force applied on each of the first and second rotatable modules is relatively large, the first and second rotatable modules must be made more durable, thereby increasing weight and manufacturing cost. In addition, the stability of the typical support stand during the movement may decrease due to abrasion or deformation of the first and second rotatable modules.

What is needed, therefore, is a new support stand for a flat-panel display monitor and an elevating support that overcomes the above mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
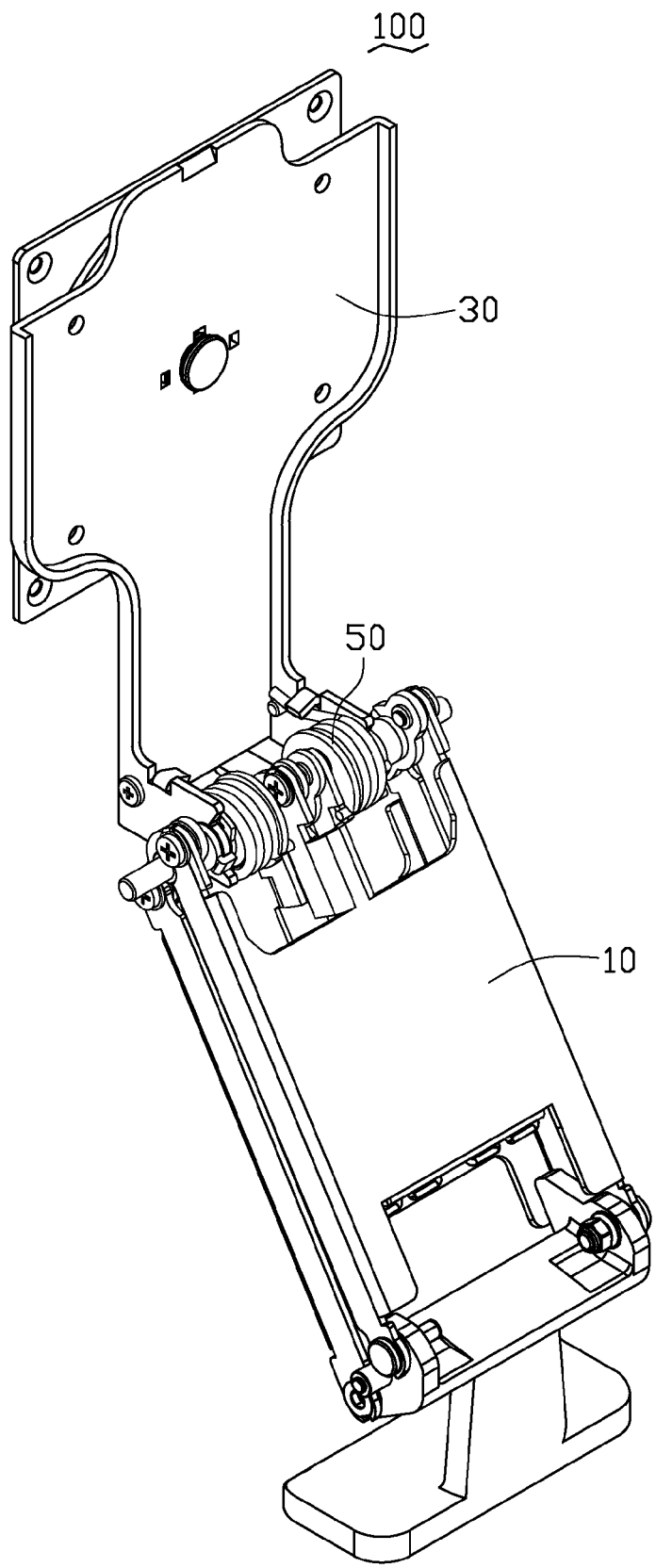
FIG. 1 is an assembled, isometric view of one embodiment of a support stand for a flat-panel display monitor, the support stand including one embodiment of an elevating support.

Referring to FIG. 1, a support stand 100 for a flat-panel display monitor includes an elevating support 10, a rotatable bracket 30, and two hinge assemblies 50 rotatably connecting the rotatable bracket 30 to the elevating support 10.

Figure 2:
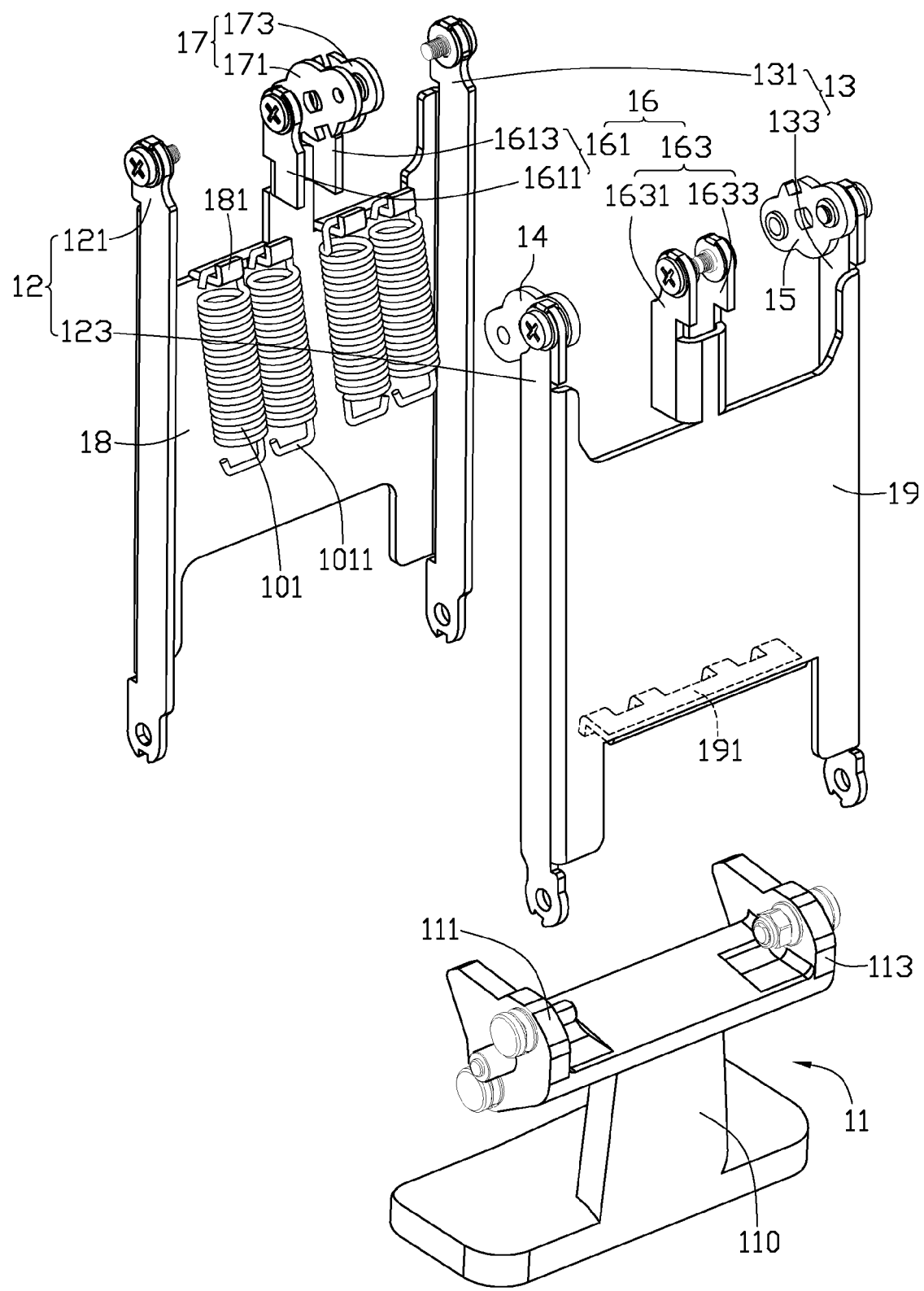
FIG. 2 is an exploded, isometric view of the elevating support in FIG. 1.

Referring also to FIG. 2, the elevating support 10 includes a base member 11, a first rotatable module 12, a second rotatable module 13, a first connecting member 14, a second connecting member 15, a third rotatable module 16, a connecting module 17, a first reinforcing plate 18, a second reinforcing plate 19, and a plurality of tension springs 101. One end of the first rotatable module 12 is connected to the first connecting member 14, and the other end of the first rotatable module 12 is connected to the base member 11. One end of the second rotatable module 13 is connected to the second connecting member 15, and the other end of the second rotatable module 13 is connected to the base member 11. The first and second rotatable modules 12, 13 are rotatable along a same direction relative to the base member 11. The third rotatable module 16 is positioned between the first and second rotatable modules 12, 13 and rotatably follows the first and second rotatable modules 12, 13.

The base member 11 includes a substantially I-shaped holder 110, a first supporting block 111 and a second supporting block 113 extending substantially perpendicularly from opposite ends of a top portion of the holder 110.

The first rotatable module 12 includes two rotatable arms 121, 123. First end portions of the rotatable arms 121, 123 are rotatably assembled on two ends of the first connecting member 14, and second end portions of the rotatable arms 121, 123 are rotatably assembled on two ends of the first supporting block 111. The first connecting member 14 defines a notch 141 (shown in FIG. 3) in an edge portion.

The second rotatable module 13 is positioned opposite to the first rotatable module 12, and the first and second rotatable modules are spaced by a predetermined distance. The second rotatable module 13 includes two rotatable arms 131, 133. First end portions of the rotatable arms 131, 133 are rotatably assembled on two ends of the second connecting member 15, and second end portions of the rotatable arms 131, 133 are rotatably assembled on two ends of the second supporting block 113.

The third rotatable module 16 includes a first supporting arm 161 and a second supporting arm 163. The first supporting arm 161 includes two supporting portions 1611, 1613 positioned opposite to each other. The second supporting arm 163 includes two supporting portions 1631, 1633 positioned opposite to each other.

The connecting module 17 includes a first connecting piece 171 rotatably connecting the supporting portions 1611, 1631 of the third rotatable module 16, and a second connecting piece 173 rotatably connecting the supporting portions 1613, 1633 of the third rotatable module 16.

The first reinforcing plate 18 connects the rotatable arm 121, the first supporting arm 161, and the rotatable arm 131 together. The first reinforcing plate 18 forms a plurality of latching hooks 181 on a top end portion.

The second reinforcing plate 19 connects the rotatable arm 123, the second supporting arm 163, and the rotatable arm 133 together. The second reinforcing plate 19 forms a plurality of latching hooks 191 on a bottom end portion.

Each of the tension springs 101 includes two hooks 1011 extending from opposite end portions of the tension spring 101. The two hooks 1011 of the tension spring 101 are latched to the corresponding latching hooks 181, 191 of the first and second reinforcing plates 18, 19.

Figure 3:
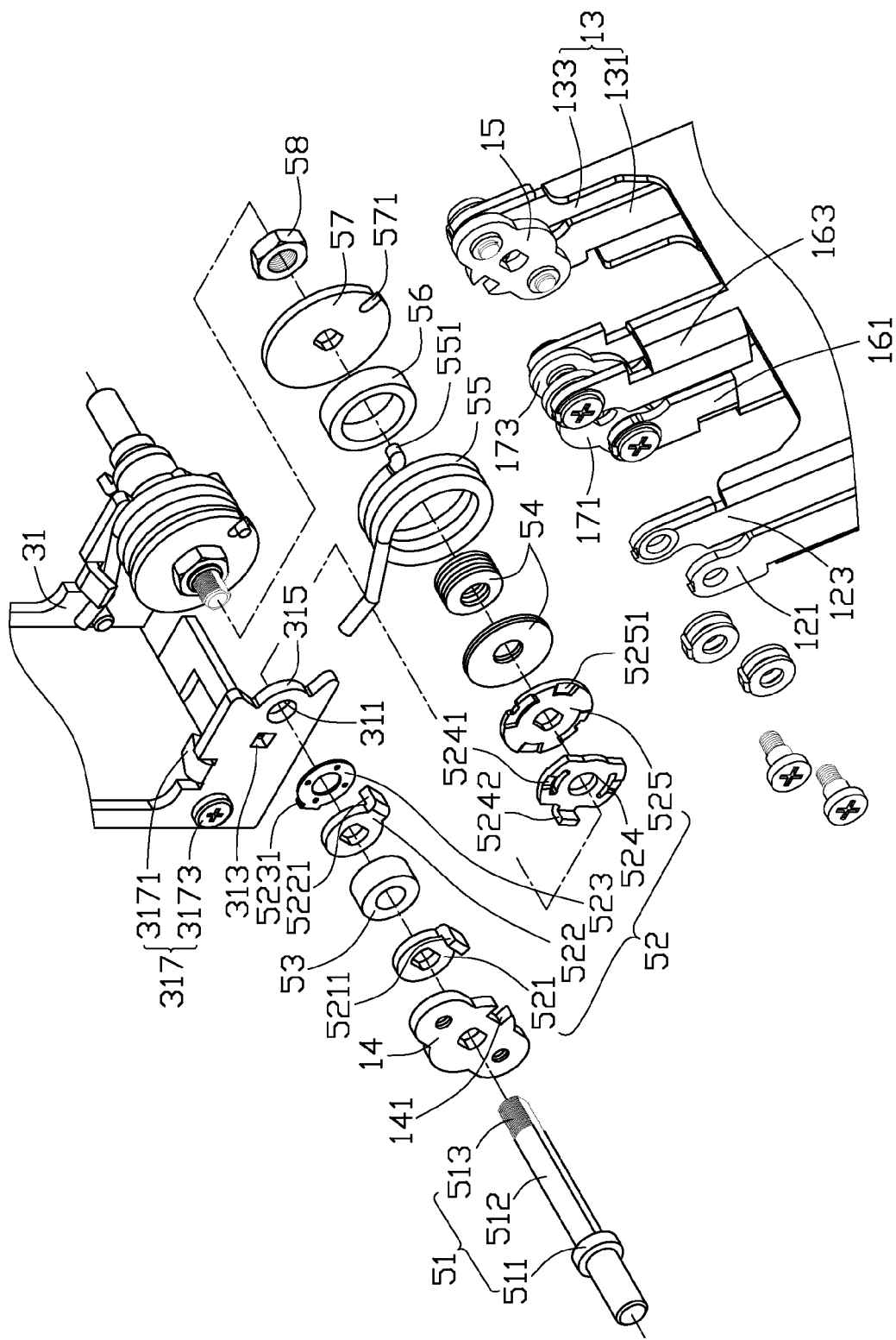
FIG. 3 is a partial, exploded, isometric view of the support stand in FIG. 1.

Referring also to FIG. 3, the rotatable bracket 30 includes two side plates 31 extending from opposite sides of a bottom portion of the rotatable bracket 30. Each of the side plates 31 defines a pivot hole 311, a fixing groove 313 adjacent to the pivot hole 311, and an arched restricting groove 315 in an end portion. Each of the side plates 31 also forms a latching tab 3171 on an edge portion away from the restricting groove 315. A latching screw 3173 is inserted through an end portion of the side plate 31 adjacent to the latching tab 3171. The latching tab 3171 and the latching screw 3173 cooperatively form a latching structure 317.

Each hinge assembly 50 includes a pivotal shaft 51, a washer group 52, a sleeve 53, two resilient members 54, a torsion spring 55, a ring 56, a resisting piece 57, and a fastening member 58 sleeved on the pivotal shaft 51.

The pivotal shaft 51 includes a flange 511, and a shaft portion 512 extending from the flange 511 along an extending direction of the pivotal shaft 51. A cross-section of the shaft portion 512 may be non-circular. In the illustrated embodiment, opposite sides of the shaft portion 512 are flattened, thereby forming a deformed shaft portion. A threaded portion 513 is formed on a distal end of the shaft portion 512 opposite to the flange 511.

The washer group 52 includes a protecting washer 521, a restricting washer 522, a frictional washer 523, a stationary washer 524, and a rotating washer 525.

The protecting washer 521 defines a deformed through hole (not labeled) in a middle portion so that the protecting washer 521 is non-rotatably sleeved on the shaft portion 512. A fixing tab 5211 is formed on an edge portion of the protecting washer 521 to insert in the notch 141 of the first connecting member 14.

The restricting washer 522 is similar to the protecting washer 521, and is non-rotatably sleeved on the shaft portion 512. A restricting tab 5221 is formed on an edge portion of the restricting washer 522 to engage in the restricting groove 315 of the rotatable bracket 30, thus defining a rotatable range of the rotatable bracket 30.

The frictional washer 523 defines a substantially circular through hole (not labeled) in a middle portion so that the frictional washer 523 is rotatably sleeved on the shaft portion 512. A positioning tab 5231 is formed on an edge portion of the frictional washer 523 and insertable in the fixing groove 313 of the rotatable bracket 30. The frictional washer 523 also defines a plurality of lubricating oil grooves (not labeled) in a side surface.

The stationary washer 524 defines a substantially circular through hole (not labeled) in a middle portion so that the stationary washer 524 is rotatably sleeved on the shaft portion 512. The stationary washer 524 forms two positioning protrusions 5241 in a side surface, and a retaining tab 5242 on an edge portion to insert in the fixing groove 313 of the rotatable bracket 30.

The rotating washer 525 defines a deformed through hole (not labeled) in a middle portion so that the rotating washer 525 is non-rotatably sleeved on the shaft portion 512. The rotating washer 525 defines four positioning grooves 5251 in a side surface to engage with the positioning protrusions 5241 of the stationary washer 524.

The sleeve 53 is substantially cylindrical, and rotatably sleeved on the shaft portion 512.

Each resilient member 54 may be a plurality of spring washers contacting each other, and rotatably sleeved on the shaft portion 512. Alternatively, the resilient member 54 may be helical springs, elastic rubber rings, or cylinders.

The torsion spring 55 includes a plurality of spring rings, and two torsion portions 551 extending from opposite ends of the torsion spring 55.

The resisting piece 57 defines a deformed through hole (not labeled) in a middle portion so that the resisting piece 57 is non-rotatably sleeved on the shaft portion 512. The resisting piece 57 also defines a cutout 571 in an edge portion to receive one of the torsion portions 551 of the torsion spring 55.

The fastening member 58 may be a nut to engage with the threaded portion 513 of the pivotal shaft 51 to keep the components between the flange 511 and the fastening member 58 together.

To assemble the support stand 100, the shaft portion 512 of one pivotal shaft 51 passes through the first connecting piece 14, the protecting washer 521, the sleeve 53, the restricting washer 522, the frictional washer 523, the pivot hole 311 of one side plate 31, the stationary washer 524, the rotating washer 525, the resilient member 54, the torsion spring 55, the ring 56, the resisting piece 57, and the first connecting piece 171, in that order. The fastening member 58 is engaged with the threaded portion 513 of the pivotal shaft 51. The fixing tab 5211 of the protecting washer 521 is fixed in the notch 141, so that the protecting washer 521 is fixed to the first connecting member 14 to prevent the first connecting member 14 from abrasion. The restricting tab 5221 of the restricting washer 522 engages in the restricting groove 315 of the rotatable bracket 30. The positioning tab 5231 of the frictional washer 523 and the retaining tab 5242 of the stationary washer 524 are inserted in the fixing groove 313 from the opposite sides of the side plate 31. One torsion portion 551 of the torsion spring 55 is latched between the latching tab 3171 and the latching screw 3173, and the other torsion portion 551 of the torsion spring 55 is latched in the cutout 571 of the resisting piece 57. Hence, half of the elevating support 10 is assembled to one side plate 31 of the rotatable bracket 30 by one hinge assembly 50. Similarly, the other half of the elevating support 10 is assembled to the other side plate 31 of the rotatable bracket 30 by the other hinge assembly 50.

When the support stand 100 is used for supporting a flat-panel display monitor, the rotatable bracket 30 is fixed to a display body (not shown) of the flat-panel display monitor. In use, an external force is applied on the display body to drive the display body with the rotatable bracket 30 to rotate along an axis of the pivotal shaft 51 relative to the elevating support 10, thereby adjusting the viewing angle of the flat-panel display monitor. The resilient members 54 become compressed and create an axial force pushing the components of the hinge assembly 50 against each other tightly. Thus, the display body may be stably maintained at a desired angle relative to the elevating support 10 due to the frictional forces generated between the components of the hinge assembly 50. A torsion force of the torsion spring 55 either increases or decreases according to the rotation of the rotatable bracket 20, thus preventing the hinge assembly 50 from damage by excessive forces.

When the height of the display body needs to be adjusted, the display body can be pushed upwards or downwards to increase or decrease the height of the display body via the elevating support 10. During the adjusting process, the height of the flat-panel display monitor changes, but the viewing angle of the flat-panel display monitor remains the same. When the flat-panel display monitor is lifted to a desired height, the flat-panel display monitor can be stably maintained at the desired height by frictional forces generated between the components of the elevating support 10. An elastic force of the tension spring 101 either increases or decreases according to the motion of the elevating support 10, thereby preventing the support stand 100 from damage by excessive forces.

Since the first, second, and third rotatable modules 12, 13, 16 cooperatively support the rotatable bracket 30 via the hinge assemblies 50, the weight of the flat-panel display monitor acting on the rotatable bracket 30 is distributed to the first, second, and third rotatable modules 12, 13, 16. A force applied on each of the first, second, and third rotatable modules 12, 13, 16 is relatively small, so that the first, second, and third rotatable modules 12, 13, 16 are difficult to abrade or deform, and manufacturing is simple. Therefore, the support stand 100 has a low manufacturing cost and a high stability.

In alternative embodiments, the rotatable bracket 30 may be rotatably connected to the elevating support 10 by one hinge assembly 50, and the pivotal shaft 51 of the hinge assembly 50 needs to be elongated to extend through the first connecting member 14, the connecting module 17, and the second connecting member 15. The first and second reinforcing plates 18, 19 may be omitted, so a third supporting block may be formed on the base member 11 between the first and second supporting blocks 111, 113, and the first and second supporting arms 161, 163 may be elongated to rotatably assemble on the third supporting block.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand for a flat-panel display monitor, the support stand comprising:
    a rotatable bracket comprising two side plates extending from opposite sides thereof, one of the side plates defining a restricting groove in an end portion;
    an elevating support rotatably connected to the rotatable bracket, the elevating support comprising:
        a base member;
        a first rotatable module rotatably assembled between the rotatable bracket and the base member;
        a second rotatable module opposite to the first rotatable module, the second rotatable module being rotatably assembled between the rotatable bracket and the base member, wherein the first and second rotatable modules are spaced by a predetermined distance, and rotatable along a same direction relative to the base member; and
        a third rotatable module positioned between the first and second rotatable modules, the third rotatable module rotatably following the first and second rotatable modules; and
    a hinge assembly rotatably connecting the elevating support to the side plates of the rotatable bracket, the hinge assembly comprising a pivotal shaft, and a restricting washer non-rotatably sleeved on the pivotal shaft; the restricting washer forming a restricting tab on an edge portion and the restricting tab engaging in the restricting groove, thus defining a rotatable range of the rotatable bracket.

2. The support stand of claim 1, wherein the base member comprises a substantially I-shaped holder, a first supporting block, and a second supporting block extending substantially perpendicularly from opposite ends of a top portion of the holder.

3. The support stand of claim 2, wherein the elevating support further comprises a first connecting member; the first rotatable module comprises two rotatable arms; first end portions of the rotatable arms are rotatably assembled on two ends of the first connecting member, and second end portions of the rotatable arms are rotatably assembled on two ends of the first supporting block.

4. The support stand of claim 2, wherein the elevating support further comprises a second connecting member; the second rotatable module comprises two rotatable arms; first end portions of the rotatable arms are rotatably assembled on two ends of the second connecting member, and second end portions of the rotatable arms are rotatably assembled on two ends of the second supporting block.

5. The support stand of claim 1, wherein the third rotatable module comprises a first supporting arm and a second supporting arm, each of the first and second supporting arms comprises two supporting portions positioned opposite to each other; the elevating support further comprises a connecting module comprising a first connecting piece and a second connecting piece; one supporting portion of the first supporting arm and one supporting portion of the second supporting arm are rotatably assembled on two ends of the first connecting piece, the other supporting portion of the first supporting arm and the other supporting portion of the second supporting arm are rotatably assembled on two ends of the second connecting piece.

6. The support stand of claim 1, wherein the elevating support further comprises a reinforcing plate connecting the first rotatable module, the second rotatable module, and the third rotatable module.

7. The support stand of claim 1, wherein one of the side plate comprises a latching structure; the hinge assembly comprises a pivotal shaft, a resisting piece non-rotatably sleeved on the pivotal shaft, and a torsion spring rotatably sleeved on the pivotal shaft; the resisting piece defines a cutout in an edge portion; the torsion spring comprises a first torsion portion latched at the latching structure, and a second torsion portion latched in the cutout of the resisting piece.

8. The support stand of claim 1, wherein the hinge assembly comprises a pivotal shaft, a stationary washer rotatably sleeved on the pivotal shaft, and a rotating washer non-rotatably sleeved on the pivotal shaft; the stationary washer forms a positioning protrusion in a side surface, the rotating washer defines a positioning groove in a side surface to engage with the positioning protrusion of the stationary washer.

9. The support stand of claim 1, wherein the hinge assembly comprises a pivotal shaft, a frictional washer, a resilient member, and a fastening member sleeved on the pivotal shaft to provide frictional force for the rotatable bracket.

10. The support stand of claim 1, wherein the elevating support further comprises a first connecting member connected on the first rotatable module, a second connecting member connected on the second rotatable module, and a connecting module connected on the third rotatable module; the hinge assembly comprises a pivotal shaft extending through the side plates of the rotatable bracket, the first and second connecting members, and the connecting module.

11. The support stand of claim 10, wherein the first connecting member defines a notch in an edge portion, the hinge assembly further comprises a protecting washer non-rotatably sleeved on the pivotal shaft; the protecting washer forms a fixing tab on an edge portion to insert in the notch of the first connecting member.

12. A support stand for a flat-panel display monitor, the support stand comprising:
    a rotatable bracket comprising two side plates extending from opposite sides thereof, one of the side plates defining a restricting groove in an end portion;
    an elevating support rotatably connected to the rotatable bracket, the elevating support comprising:
        a base member;
        a first rotatable module rotatably assembled between the rotatable bracket and the base member; and
        a second rotatable module opposite to the first rotatable module, the second rotatable module being rotatably assembled between the rotatable bracket and the base member, wherein the first and second rotatable modules are spaced by a predetermined distance, and rotatable along a same direction relative to the base member; and a hinge assembly rotatably connecting the elevating support to the side plates of the rotatable bracket, the hinge assembly comprising a pivotal shaft, and a restricting washer non-rotatably sleeved on the pivotal shaft; the restricting washer forming a restricting tab on an edge portion and the restricting tab engaging in the restricting groove, thus defining a rotatable range of the rotatable bracket.

* * * * *